United States Patent
Cha (10) Patent No.: US 9,917,512 B2
(45) Date of Patent: Mar. 13, 2018

(54) POWER SUPPLY, ELECTRONIC DEVICE INCLUDING THE SAME, AND POWER SUPPLY METHOD THEREOF

(71) Applicant: Samsung Electronics Co., Ltd., Suwon-si, Gyeonggi-do (KR)

(72) Inventor: Jae-deok Cha, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 573 days.

(21) Appl. No.: 14/333,599

(22) Filed: Jul. 17, 2014

(65) Prior Publication Data

US 2015/0198932 A1 Jul. 16, 2015

(30) Foreign Application Priority Data

Jan. 16, 2014 (KR) .................. 10-2014-0005536

(51) Int. Cl.
*H02M 3/156* (2006.01)
*G06F 1/32* (2006.01)
*G06F 1/26* (2006.01)
*H02M 1/00* (2006.01)

(52) U.S. Cl.
CPC .......... *H02M 3/156* (2013.01); *G06F 1/3206* (2013.01); *G06F 1/26* (2013.01); *H02M 2001/008* (2013.01); *Y10T 307/406* (2015.04)

(58) Field of Classification Search
CPC ........ G06F 1/26; G06F 1/3206; H02M 3/156; Y10T 307/406
USPC .................................. 713/300; 323/318, 371
See application file for complete search history.

(56) References Cited

U.S. PATENT DOCUMENTS

| | | | |
|---|---|---|---|
| 6,748,545 B1 | 6/2004 | Helms | |
| 7,900,067 B2* | 3/2011 | Beard | G06F 1/206 |
| | | | 712/208 |
| 8,054,653 B2 | 11/2011 | Ryu et al. | |
| 8,212,542 B2 | 7/2012 | Huang et al. | |
| 8,217,626 B2 | 7/2012 | Winger et al. | |
| 2007/0226524 A1* | 9/2007 | Nakamura | G06F 1/26 |
| | | | 713/300 |
| 2008/0179955 A1* | 7/2008 | Nakashima | B60L 11/1881 |
| | | | 307/48 |
| 2009/0049314 A1* | 2/2009 | Taha | G06F 1/3203 |
| | | | 713/300 |

(Continued)

FOREIGN PATENT DOCUMENTS

| | | |
|---|---|---|
| JP | 2007135305 | 5/2007 |
| KR | 20070113478 | 11/2007 |

(Continued)

*Primary Examiner* — Ji H Bae
(74) *Attorney, Agent, or Firm* — Staas & Halsey LLP (57) ABSTRACT

An electronic device is provided, which includes a user interface unit configured to receive an input of a user command, a controller configured to perform an operation according to the input user command and to control the user interface to display a screen according to the result of the operation, and a power supply configured to provide a power to the user interface and the controller, wherein the power supply includes a plurality of converters configured to supply the power to respective loads of the electronic device, and the plurality of converters output voltage values that correspond to levels of the respective loads connected thereto.

14 Claims, 8 Drawing Sheets

(56) References Cited

U.S. PATENT DOCUMENTS

| | | | | |
|---|---|---|---|---|
| 2010/0299545 A1* | 11/2010 | Lyu | ............... | G06F 1/3203 713/322 |
| 2012/0054503 A1* | 3/2012 | Hsiao | ............... | G06F 1/3206 713/300 |
| 2012/0329509 A1* | 12/2012 | Ravichandran | ... | H04W 52/0274 455/522 |
| 2013/0007493 A1* | 1/2013 | Murakami | ............... | G06F 1/324 713/322 |
| 2015/0006915 A1* | 1/2015 | Ganesan | ............... | G06F 1/26 713/300 |
| 2015/0309552 A1* | 10/2015 | Vanka | ............... | G06F 1/324 713/322 |

FOREIGN PATENT DOCUMENTS

| KR | 100881774 | 2/2009 |
|---|---|---|
| KR | 100967048 | 6/2010 |

* cited by examiner

POWER SUPPLY, ELECTRONIC DEVICE INCLUDING THE SAME, AND POWER SUPPLY METHOD THEREOF

CROSS-REFERENCE TO RELATED APPLICATIONS

This application claims the benefit of priority under 35 U.S.C. § 119(a) to Korean Patent Application No. 10-2014-0005536, filed on Jan. 16, 2014, in the Korean Intellectual Property Office, the disclosure of which is incorporated herein by reference.

BACKGROUND OF THE INVENTION

1. Field of the Invention

The present general inventive concept relates to a power supply, an electronic device including the same, and a power supply method thereof, and more particularly to a power supply which can provide variable voltages to respective constituent elements of an electronic device according to load states of the respective constituent elements, the electronic device including the power supply, and a power supply method thereof.

2. Description of the Related Art

Recently, with the repeated development of portable electronic devices, mobility has been emphasized, and battery use time is an important factor to users.

In order to achieve improvement of battery use time of a portable electronic device, manufacturers have greatly been concerned about low-power design based on power management functions of respective constituent elements.

In the existing, conventional portable electronic device, however, fixed voltages are supplied to the respective constituent elements of the electronic device, and thus it is difficult to reduce power consumption through the respective constituent elements.

SUMMARY OF THE INVENTION

The present general inventive concept has been made to address at least the above problems and/or disadvantages and to provide at least the advantages described below. Accordingly, the present general inventive concept provides a power supply which can provide variable voltages to respective constituent elements of an electronic device according to load states of the respective constituent elements, the electronic device including the power supply, and a power supply method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic device including a user interface unit configured to receive an input of a user command, a controller configured to perform an operation according to the input user command and to control the user interface unit to display a screen according to the result of the operation, and a power supply configured to provide a power to the user interface unit and the controller, wherein the power supply includes a plurality of converters configured to supply the power to respective loads of the electronic device, and the plurality of converters output voltage values that correspond to levels of the respective loads connected thereto.

The power supply may include an inputter configured to receive an input of a DC voltage, a converter configured to vary the input DC voltage to a preset first voltage to output the first voltage to a first connected load, and a power controller configured to sense the levels of the respective loads of the electronic device and to control the converter to output a voltage value that corresponds to a sensed level of the first connected load.

When the sensed level of the first connected load is lower than a preset first load level, the power controller may control the converter to output a second voltage that is lower than the preset first voltage.

When the sensed level of the first connected load is higher than a third load level in a state where the second voltage is output, the power controller may control the converter to output the preset first voltage.

The third load level may be smaller than the first load level.

The preset first load level may be a nominal voltage of the first connected load.

The plurality of converters may have different reference output voltages.

The converter and the power controller may transmit or receive the sensed load level and control information through serial communication.

The serial communication may be Inter-Integrated Circuit (I2C) or daisy chain.

The respective loads may be one of a main board load of the electronic device, a memory, an input/output (I/O) configuration, and a graphic configuration.

The plurality of converters of the power supply may output voltage values that correspond to the levels of the respective loads connected thereto when the electronic device is driven through a battery power in a power saving state.

Exemplary embodiments of the present general inventive concept may also provide an electronic device including a user interface unit configured to receive an input of a user command, a controller configured to perform an operation according to the input user command and to control the user interface unit to display a screen according to the result of the operation, and a power supply configured to provide a power to the user interface unit and the controller, wherein the power supply includes a converter configured to supply a plurality of powers to loads of the electronic device, and the converter outputs voltage values that correspond to levels of the respective loads connected thereto.

Exemplary embodiments of the present general inventive concept may also provide a power supply of an electronic device including an inputter configured to receive an input of a DC voltage, a converter configured to vary the input DC voltage to a preset first voltage and to output the first voltage to loads connected to the electronic device, and a power controller configured to sense levels of the loads and to control the converter to output voltage values that correspond to the sensed levels of the loads.

When a sensed level of a first load is lower than a preset first load level, the power controller may control the converter to output a second voltage that is lower than the preset first voltage.

When the sensed level of the first load is higher than a third load level in a state where the second voltage is output, the power controller may control the converter to output the preset first voltage.

The third load level may be smaller than the first load level.

The preset first load level may be a nominal voltage of the first load.

The power supply may further include a plurality of converters, wherein the plurality of converters have different reference output voltages.

The converter and the power controller may transmit or receive the sensed load level and control information through serial communication.

The present general inventive concept may also provide a power supply method of an electronic device including sensing a level of a load connected to a converter, setting an output value of the converter that corresponds to the sensed level of the load, and supplying a power to the load based on the set output value.

Exemplary embodiments of the present general inventive concept may also provide a method of supplying power to a plurality of components of an electronic device, including providing a first voltage level to the components, sensing respective load levels of the components, and converting the first voltage level to a second voltage level based on a sensed load level of a first component and providing the second voltage level to the first component.

The method may further comprise converting the first voltage level to a third voltage level based on a sensed load level of a second component and providing the third voltage level to the second component.

The second and third voltage levels may be provided to the first and second components simultaneously.

Each of the first, second and third voltage levels may have different values.

A timing of converting the first voltage level to the second or third voltage level based on the sensed load levels of the components may be controlled by a hysteresis function.

The method may further comprise classifying the plurality of components into a plurality of groups according to required nominal operating voltages of each component, and providing the first, second and third voltages respectively to the classified groups of components based on the required nominal operating voltages.

The method may further comprise converting the second voltage back to the first voltage when the sensed load level of the first component becomes a predetermined load level.

BRIEF DESCRIPTION OF THE DRAWINGS

The above and other features and utilities of the present general inventive concept will be more apparent and more readily appreciated from the following detailed description of the embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
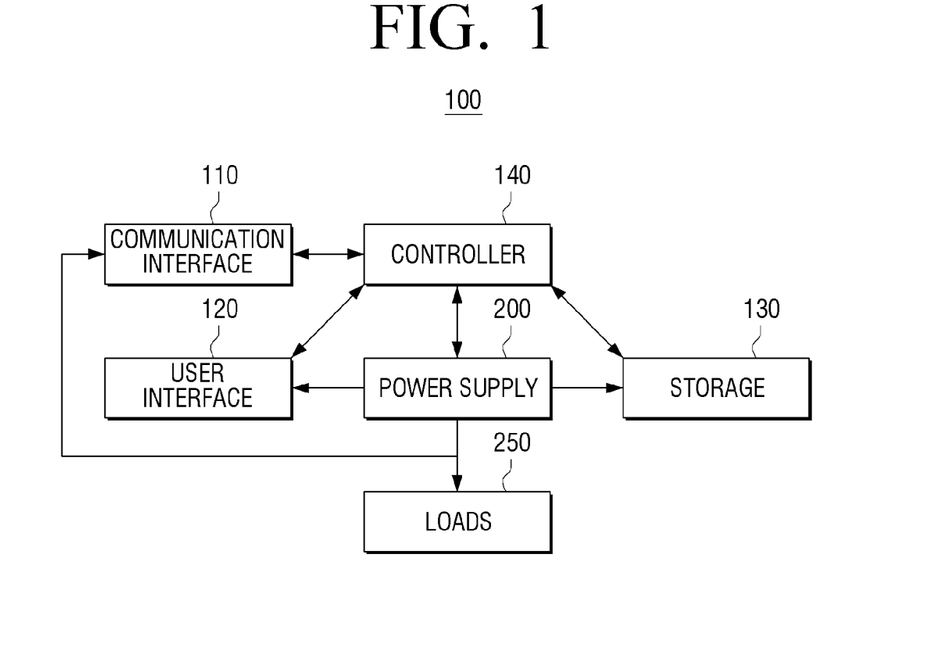
FIG. 1 is a block diagram illustrating an electronic device according to an exemplary embodiment of the present general inventive concept.

FIG. 1 illustrates a block diagram of an electronic device according to an embodiment of the present general inventive concept.

Referring to FIG. 1, an electronic device 100 according to an embodiment of the present general inventive concept includes a communication interface 110, a user interface unit 120, a storage 130, a controller 140, a power supply 200, and one or more loads 250 which require power. The loads 250 could be any of various electronic components of the electronic device 100, including without limitation, a CPU, a memory device, an input/output (I/O) configuration, a graphic configuration, or any type of chip, card or circuitry requiring power to perform functions of the electronic device 100. Hereinafter, "load" may refer to the load of a constituent component or to the collective load of the components of the electronic device 100. Here, the electronic device 100 may be a notebook computer, a tablet, an MP3 player, a smart phone, a cellular phone, or a PMP, or other electronic apparatus which operates using a battery.

The communication interface 110 is provided to connect the electronic device 100 to an external device (not illustrated), and may be connected to the external device through, for example, a wire, a LAN (Local Area Network) and the Internet, or through a wireless communication method (e.g., Global System for Mobile (GSM), Universal Mobile Telecommunications System (UMTS), Long-Term Evolution (LTE), or Wireless Broadband (WiBRO)).

The user interface unit 120 is provided with a plurality of function keys for a user to set or select various kinds of functions supported in the electronic device 100, and may display various kinds of information provided by the electronic device 100. The user interface unit 120 may be implemented by a device that simultaneously implements an input and an output, such as, for example, a touch screen, or by a device that provides input and output through a combination of a mouse and a monitor or through auditory devices such as a microphone and a speaker.

The storage 130 is a storage device that stores program commands and data, which the controller 140 requires while the electronic device 100 operates. The storage 130 may perform write and read operations by directly accessing a stored place in accordance with a command of a central processing unit.

The storage 130 stores programs to drive the electronic device 100. Specifically, the storage 130 may store a program that is a set of various kinds of commands required to drive the electronic device 100. The storage 130 may be, for example, a read-only memory (ROM), hard disk drive (HDD), solid state drive (SSD), non-volatile semiconductor memory, or Flash memory device.

The controller 140, which may be, for example, a processor, CPU, programmable logic unit, field programmable gate array or integrated circuit, performs control of respective constituent elements of the electronic device 100. For example, if a turn-on command is input to supply a power, the controller 140 boots the system using an operating system (O/S) stored in the storage 130 according to a command stored in the ROM. Once the booting is completed, the controller 140 may perform an operation (or service) that corresponds to the user command input through the user interface unit 120. Then, the controller 140 may control the user interface unit 120 to display a screen according to the result of the operation.

Figure 2:
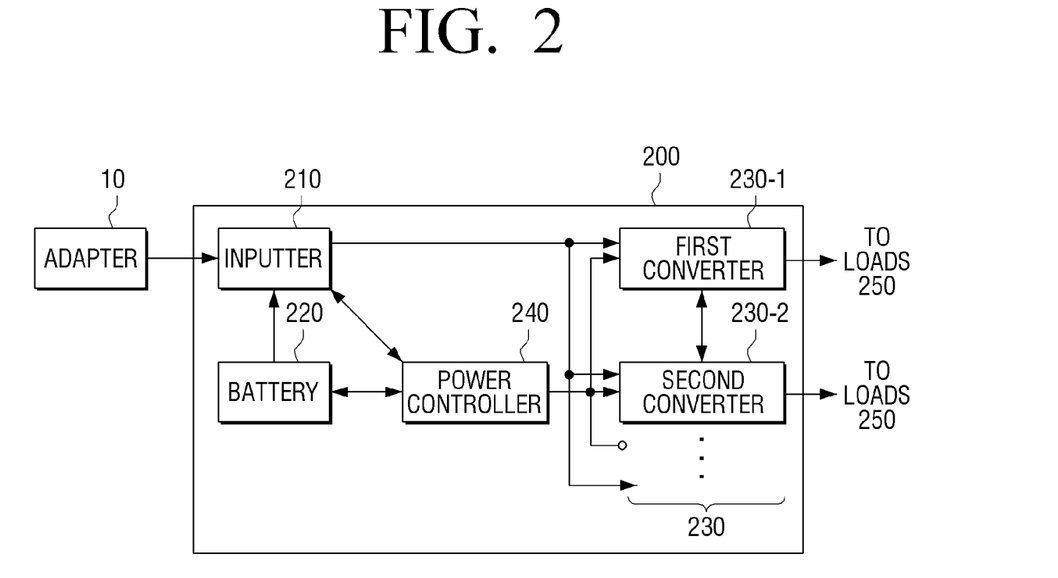
FIG. 2 is a block diagram illustrating a configuration of a power supply of FIG. 1 according to an exemplary embodiment of the present general inventive concept.

If information on a power state of the electronic device 100 is received from the power supply 200, as will be described below, the controller 140 may control the user interface unit 120 to output a message that corresponds to the received information. For example, if the controller 140 is notified by the power supply 200 that an adapter (as illustrated in FIG. 2) is connected to the electronic device 100, the controller 140 may control the user interface unit 120 to turn on an indication lamp that indicates that the adapter is connected. If the controller 140 is notified by the power supply 200 that the battery is low or requires charging, the controller 140 may control the user interface unit 120 to display a message indicating that the battery charge is necessary.

The power supply 200 supplies a power to respective constituent elements (e.g., communication interface 110, user interface 120, etc.) in the electronic device 100 and to the one or more loads 250 using a power that is provided from an outside source (e.g., adapter power) and/or a power stored in the battery. Specifically, if an adapter is connected, the power supply 200 may provide the power provided from the adapter to the respective constituent elements of the electronic device. If a battery charge is required in a state where the adapter is connected, the power supply 200 may charge the battery using the power provided from the adapter. On the other hand, if the adapter is not connected, the power supply 200 may supply the power stored in the battery to respective constituent elements of the electronic device 100 and the one or more loads 250.

Further, the power supply 200 may sense an operation state of the electronic device 100, and if the adapter is not connected to the electronic device 100 (i.e., in a battery operation state) or if it is necessary to operate the electronic device 100 in a power saving state, the power supply 200 may control one or more converters that supply preset voltages to respective loads 250 in the electronic device 100 to output adjusted voltage levels, for example, voltage levels which are lower than the preset voltages. The detailed configuration and operation of the power supply 200 will be described below with reference to FIG. 2.

As described above, the electronic device 100 according to this exemplary embodiment may provide a variable voltage that corresponds to a load state of a load 250 in the electronic device, and thus power consumption within the electronic device 100 can be reduced.

FIG. 2 illustrates a configuration of a power supply of FIG. 1.

Referring to FIG. 2, the power supply 200 according to an embodiment of the present general inventive concept includes an inputter 210, a battery 220, a plurality of converters 230, and a power controller 240. The plurality of converters 230 may include any number of converters, for example, converter 230-1 and converter 230-2. The power supply 200 may be implemented by an integrated power supply or a separate power supply.

The inputter 210 provides a DC voltage that is inputted through an adapter 10, such as, for example, an AC/DC adapter, or a voltage that is from charge stored in the battery 220, to the plurality of converters 230 according to the state of the adapter 10 and the battery 220. Specifically, if the adapter 10 is connected to the power supply 200, the power supply 200 transfers the power that is provided from the adapter 10 to the plurality of converters 230. In this case, if the battery 220 is required to be charged, the inputter 210 may transfer the DC voltage that is received from an outside source to the battery 220. On the other hand, if the adapter 10 is not connected thereto, the inputter 210 may provide the power that is stored in the battery 220 to the plurality of converters 230.

The inputter 210 may be implemented as, for example, a narrow voltage DC charger or a DC-to-DC converter that is composed of an integrated circuit (IC), transistor (FET), inductor (L), and capacitor (C). Accordingly, as an example, the inputter 210 may convert a voltage of 19 V input from the adapter 10 into a voltage of 6 to 8.4 V and provide the converted voltage to the battery 220 and the converters 230.

The battery 220 may include at least one battery cell, charge the battery cell using an external voltage received from the inputter 210, and provide the power of the charged battery cell to the inputter 210. Here, the battery cell may be, for example, a lithium ion cell, and the battery 220 may include a plurality of battery cells.

The battery 220 may sense the state (charged state, charged degree, and normality/abnormality) of the plurality of battery cells, and provide the result of the sensing to the power controller 240.

The plurality of converters 230 may be DC-to-DC converters having the same or different preset/reference output voltages. Various electronic components may be provided in the electronic device 100, and the electronic components may have different continuous powers. Accordingly, the plurality of electronic components may be classified into a plurality of groups according to their respective, required nominal voltages, and one of the converters 230 may supply power for each group.

For example, if voltages required in the electronic device 100 are 3 V and 1.3 V, a first converter 230-1 that supplies a power of 3 V and a second converter 230-2 that supplies a power of 1.3 V may be provided. The first converter 230-1 may be connected to a configuration that requires the power supply of 3 V, and the second converter 230-2 may be connected to a configuration that requires the power supply of 1.3 V. A case where only two converters are provided has been described, but the present general inventive concept is not limited thereto. Additional various power levels may be required in the electronic device 100 and additional converters may accordingly be provided. Even in the case where the same power is provided, further grouping may be performed according to the required current level and appropriate converters may be provided accordingly.

Each converter 230 may receive DC power from the inputter 210, convert the received power to a preset first power, and output the converted power to a respectively connected load 250. Further, each converter 230 may sense the level of its connected load 250 and provide the sensed level of the load 250 to the power controller 240, for example, through serial communication. The serial communication may be accomplished, for example, by using Inter-Integrated Circuit (I2C) or a daisy chain. The connection types according to exemplary respective communication methods will be described below with reference to FIGS. 3 and 4.

Each converter 230 may output power that corresponds to the level of its connected load to the load. Specifically, each converter 230 may output a voltage value according to a control command (for example, an output power value) of the power controller 240.

The power controller 240 may also sense the level of the one or more loads 250. As discussed above, the load 250 is a configuration to which a power supply is required in the electronic device 100, and may be various kinds of electronic components provided on a main board, such as, for example a memory, an I/O configuration, and a graphic configuration. Such configurations may be divided into various groups according to their required nominal voltages, and a same converter 230 may supply power to loads 250 having a same nominal voltage. Accordingly, the power controller 240 may sense the level of the loads 250 based on the levels of voltage and current output from the converter 230.

Although it is described that the power controller 240 senses the level of the load 250, each converter 230 may sense the load 250 respectively connected thereto and transfer the sensed level of the load 250 to the power controller 240.

The power controller 240 may further control the converters 230 to provide one or more power supplies according to an operation state of the electronic device 100. For example, when the electronic device 100 receives an input of power from the adapter 10 or operates in a normal state, that is, in the case where it is not necessary to reduce the power consumption, the power controller 240 may control the converters 230 to each output a preset first voltage.

In contrast, when the electronic device 100 is not connected to the adapter and is required to operate in a power saving state, the power controller 240 may control the converts 230 to each output a power value that corresponds to the sensed level of the respective connected load 250. For example, if a sensed level of a load 250 is smaller than the preset first voltage level, the power controller 240 may control the converter 230 connected to the load 250 to output a second voltage that is lower than the preset first voltage. Here, the preset first voltage may be the nominal voltage required by the load 250, and the second voltage may be a voltage that is lower than the nominal voltage in a range where the converter 230 can operate for the corresponding load 250, and may be set, for example, by experiments of the manufacturer, by the user, or by a control program running on the electronic device 100.

If the sensed level of the load 250 becomes higher than a third voltage level in a state wherein the second voltage is presently being outputted, the power controller 240 may control the converter 230 to output the preset first voltage. Here, the third voltage level may be equal to the preset first voltage level, or may be lower than the preset first voltage level and greater than the second voltage level. The output voltage of the converter 230 may be varied by a first reference value amount when the third voltage level is equal to the first voltage level, and if the third voltage level is different from the first voltage level, the output voltage according to the sensed level of the load 250 may be adjusted in a hysteresis form. An embodiment in which the output voltage is controlled in the hysteresis form will be described below with reference to FIG. 6.

As described above, the power supply 200 according to this embodiment provides a voltage that is varied according to the level of the connected load 250 to reduce the power consumption at a load end.

Although the embodiment of FIG. 2 is described as including the power supply 200 as being provided with a plurality of converters 230 that output different voltages, the present general inventive concept is not limited thereto. For example, one converter 230 may output a plurality of voltage values, and in this case, the power supply 200 may be provided with only one converter 230. For example, the plurality of converters 230-1, 230-2 illustrated in FIG. 2 may be implemented as one application-specific integrated circuit (ASIC) chip.

Figure 3:
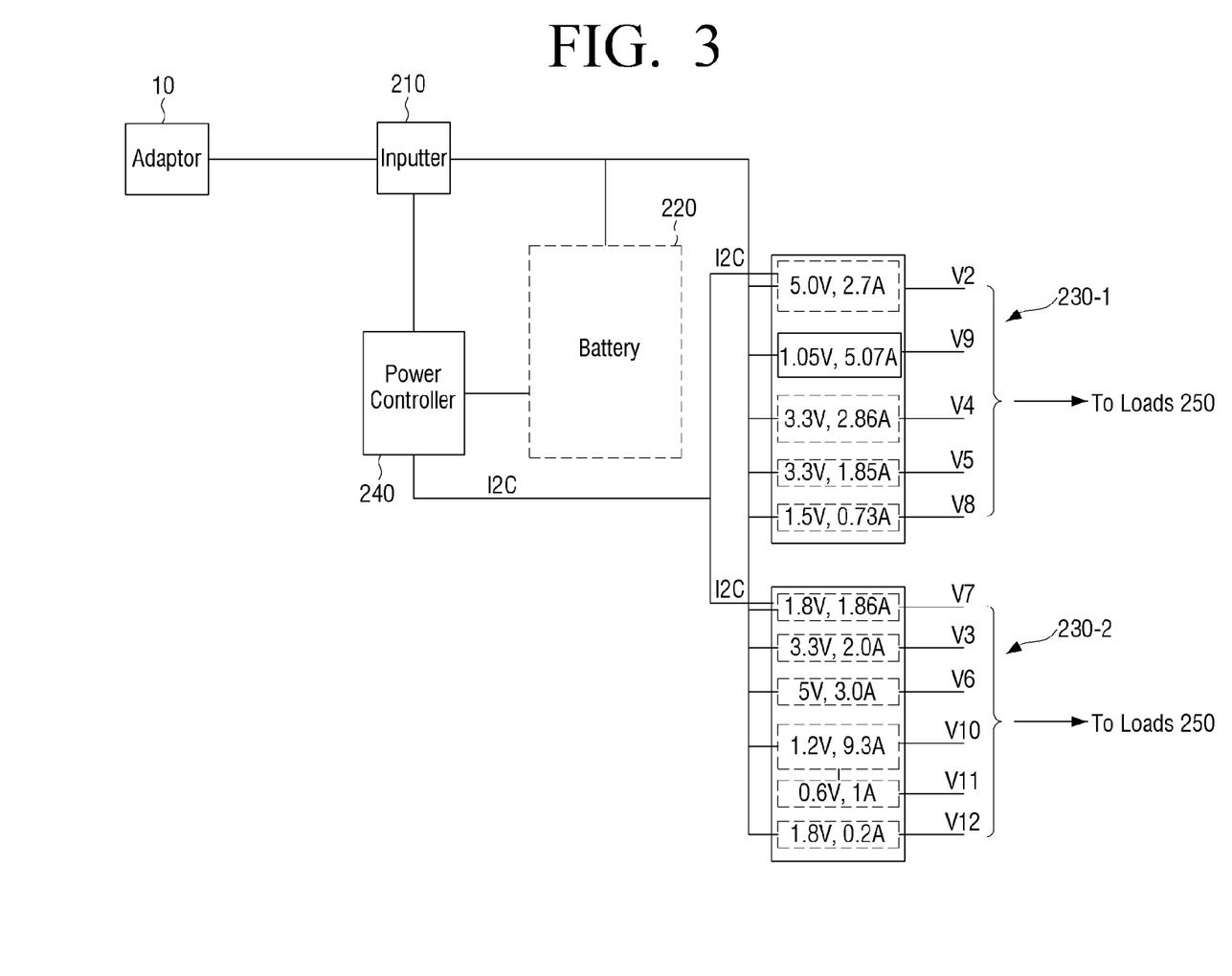
FIG. 3 is a circuit diagram of a power supply according to a an exemplary embodiment of the present general inventive concept.

FIG. 3 illustrates a circuit diagram of a power supply according to an exemplary embodiment of the present general inventive concept. In this embodiment, a power controller 240 and a plurality of converters 230 perform communication with each other through I2C.

Referring to FIG. 3, the power controller 240 receives information on the load state (load level) from the respective converters 230-1, 230-2 via an I2C serial communication method. Further, the power controller 240 may determine the power values to be output from the converters 230-1, 230-2 according to the received information, and provide the determined power level value to the converters 230-1, 230-2 in the I2C serial communication method.

Figure 4:
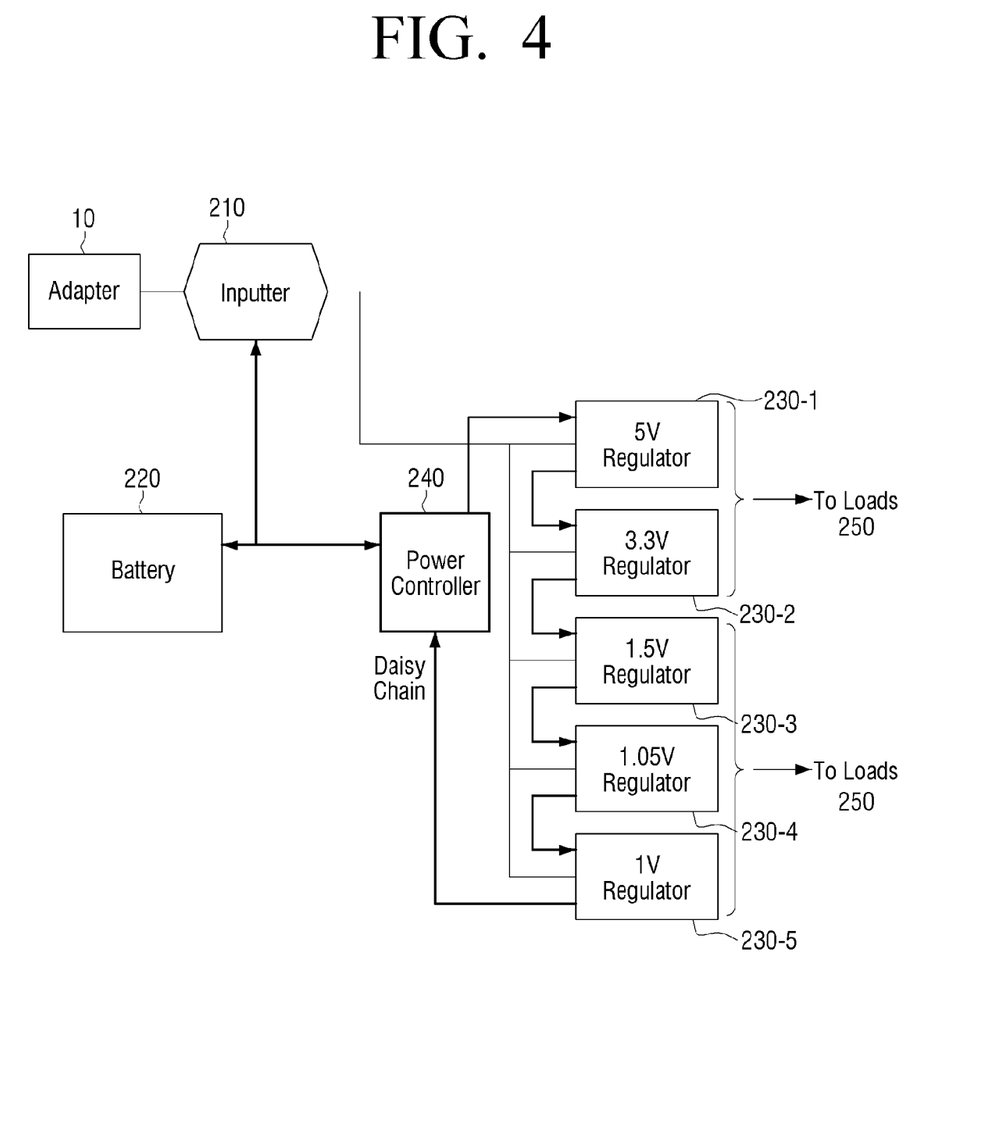
FIG. 4 is a circuit diagram of a power supply according to another exemplary embodiment of the present general inventive concept.

FIG. 4 illustrates a circuit diagram of a power supply according to another exemplary embodiment of the present general inventive concept. In this embodiment, a power controller 240 and a plurality of converters 230 perform communication with each other through a daisy chain.

Referring to FIG. 4, the power controller 240 receives information on the load state (load level) from the respective converters 230-1-230-5 in a daisy chain serial communication method. Further, the power controller 240 may determine the power values to be output from the converters 230-1-230-5 according to the received information, and provide the determined power level value to the converters 230-1-230-5 in the daisy chain serial communication method.

Although the above description of FIGS. 3 and 4 describes that I2C or a daisy chain may be used as the serial communication, the power controller and the converter may perform communication with each other using other serial methods. Further, it will be apparent that a parallel communication method may be used in addition to or as an alternative to the serial method.

Figure 5:
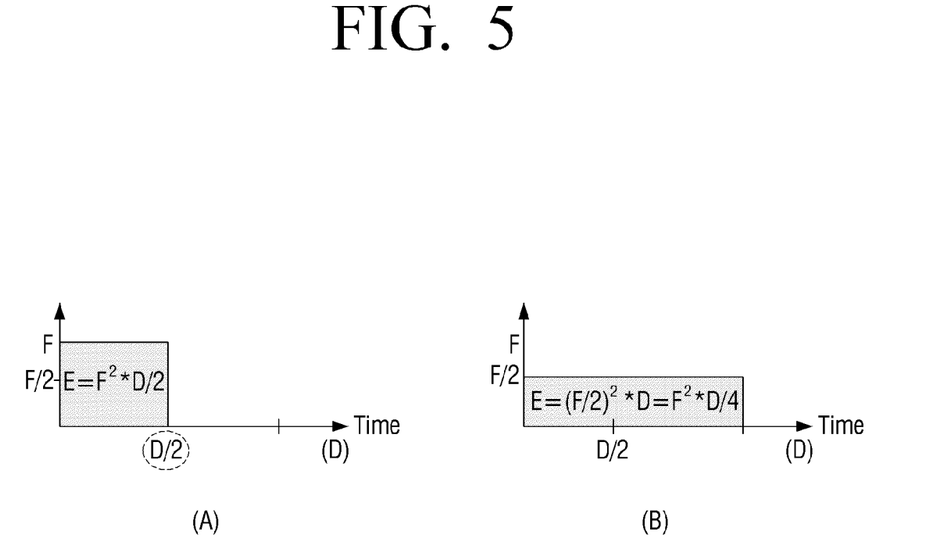
FIG. 5 is a diagram illustrating a power reducing method at a load end according to an exemplary embodiment of the present general inventive concept.

FIG. 5 illustrates a diagram explaining a power reducing method at a load end according to an embodiment of the present general inventive concept.

Referring to FIG. 5, power consumption at the load end is in proportion to a square of a voltage level of an output capacitor that is connected to the converter 230.

A converter in the related art outputs a fixed voltage in a range that a load configuration requires. However, since the output voltage of a converter 230 according to the present general inventive concept may be finely adjusted according to the low/high level of the load, additional power consumption at the load end can be reduced, as illustrated in the energy reduction in chart (B) as compared to chart (A). In chart (A) the total energy (E) consumed is:

$$E=F^2*(D/2) \qquad \text{Equation 1}$$

where F is a converter voltage level and D is time. However, if the voltage is adjusted according to the low/high level of the load, as illustrated in chart (B) the total energy (E) consumed is:

$$E=(F/2)^2*D=F^2*(D/4) \qquad \text{Equation 2}$$

The adjustment therefore may result in a reduction of energy consumption of fifty percent.

Accordingly, in this embodiment, if the level of the load that is required at a load 250 connected to the converter 230 is lower than the preset first voltage, a voltage that is lower than the nominal voltage of the corresponding load is outputted to reduce the additional power consumption. The detailed implementation type will be described in more detail with reference to FIG. 6.

Figure 6:
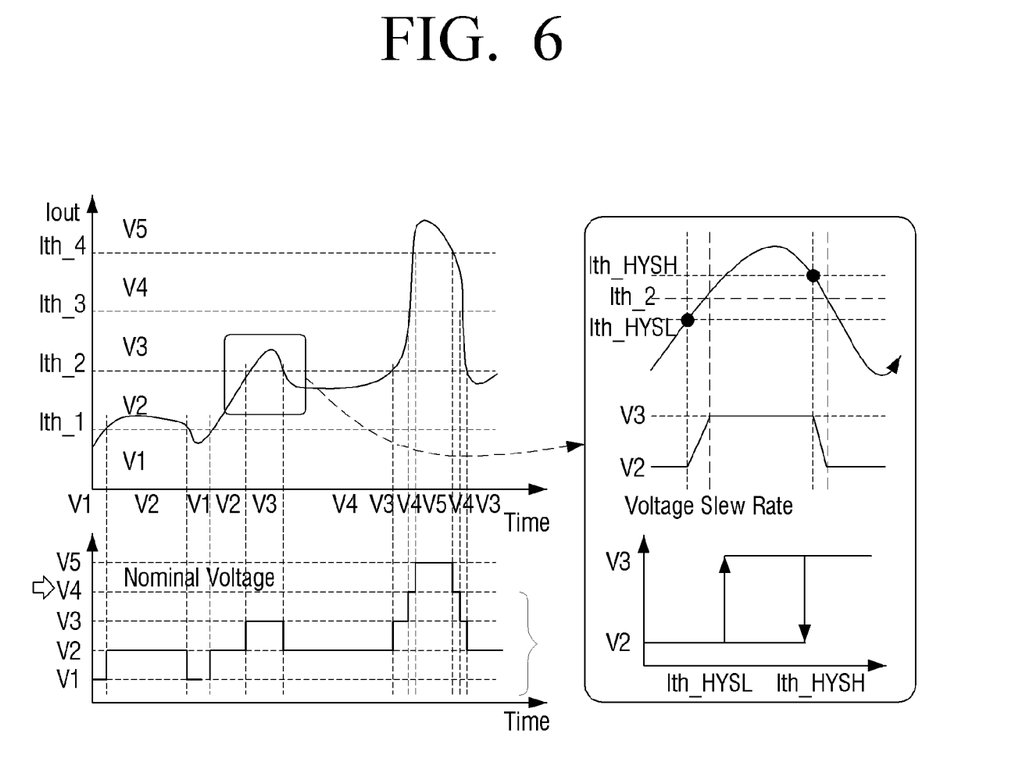
FIG. 6 is a diagram illustrating an operation example of a converter of FIG. 2 according to an exemplary embodiment of the present general inventive concept.

FIG. 6 is a diagram illustrating an operation example of a converter 230 of FIG. 2.

Referring to FIG. 6, a load that is connected to a converter is measured based upon an output current (Iout) of the converter. Accordingly, the power controller 240 divides the output current Iout of the converter into five regions, and controls the converter 230 to output a corresponding voltage value (V1-V5) for each divided region, as illustrated in the graph on upper left side of FIG. 6. In FIG. 6, V4 denotes a nominal voltage of a node that may be designated as a reference output voltage (or reference voltage). However, the present general inventive concept is not limited thereto. The designated region and reference output voltage may differ by converters.

In the exemplary scenario illustrated in FIG. 6, only current that is lower than Ith_1 is initially required, and the converter 230 is controlled to have a voltage value of V1. In this state, if the current value becomes equal to or higher than Ith_1, the converter 230 is controlled to have a voltage value of V2. Thereafter, if the current value becomes lower than Ith_1, the converter 230 is controlled to have a voltage value of V1 again. It should be understood that although in the illustrated example the load is divided into five regions, the present general inventive concept is not limited thereto. In implementation, the load may be divided into, for example, two to four regions, or according to circumstances, the load may be divided into six or more regions.

It is described that the level of the reference current to which the voltage ascends is equal to the level of the reference current to which the voltage descends. However, in order to prevent the output voltage from being frequently changed, the output voltage against the sensed load level may be set with hysteresis as illustrated on the right side of FIG. 6. In this case, a hysteresis band (Ith_HYSL (low) to Ith_HYSH (high)) may be determined in consideration of a slew rate of the voltage change.

Figure 7:
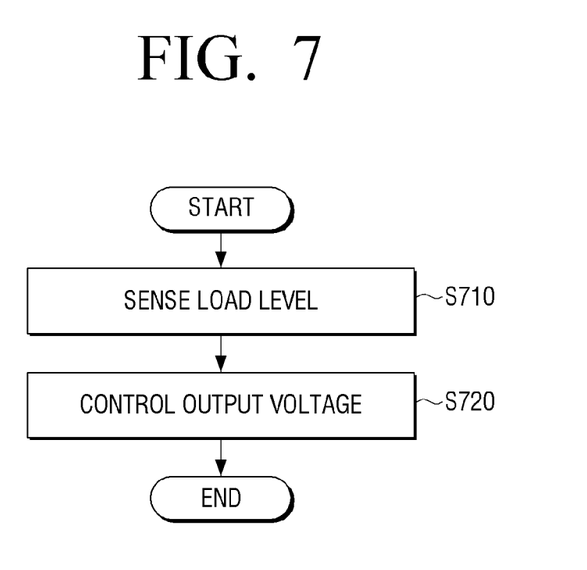
FIG. 7 is a flowchart illustrating a power supply method according to an exemplary embodiment of the present general inventive concept.

FIG. 7 is a flowchart illustrating a power supply method according to an embodiment of the present general inventive concept.

Referring to FIG. 7, if it is required to additionally reduce the power consumption of the electronic device (the determination standard thereof will be described in relation to FIG. 8), the level of the load that is connected to the converter is sensed (operation S710). Specifically, the level of the load that is connected to the converter may be sensed through sensing the voltage level and the current level output from the converter.

The output voltage of the converter is adjusted according to the sensed load level to output the adjusted voltage (operation S720). Specifically, the output voltage value of the converter that corresponds to the sensed load level is determined, and the power may be supplied to the load with the determined output voltage value. Since the operation of determining the output voltage value that corresponds to the sensed load level has been described with reference to FIG. 6, the duplicate explanation thereof will be omitted.

According to the power supply method according to this exemplary embodiment as described above, varied voltages that correspond to the corresponding load states are provided to the respective loads in the electronic device, and thus the power consumption of various components of the device, and thus, the overall device, can be reduced. Specifically, if power saving of the electronic device is required, a voltage that is lower than the nominal voltage of the corresponding configuration is supplied to the configuration of the electronic device to reduce the power consumption. The power supply method as illustrated in FIG. 7 may be executed on the electronic device having the configuration of FIG. 1 or the power supply having the configuration of FIG. 2, and may be executed on the electronic device or the power supply having other configurations.

The power supply method of the present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The non-transitory computer readable medium may be a medium which semi-permanently stores data and is readable by a device. Specifically, various applications and programs as described above may be stored and provided in the non-transitory computer readable medium, such as, a CD, a DVD, a hard disc, a Blu-ray disc, a USB memory device, a memory card, and a ROM.

Figure 8:
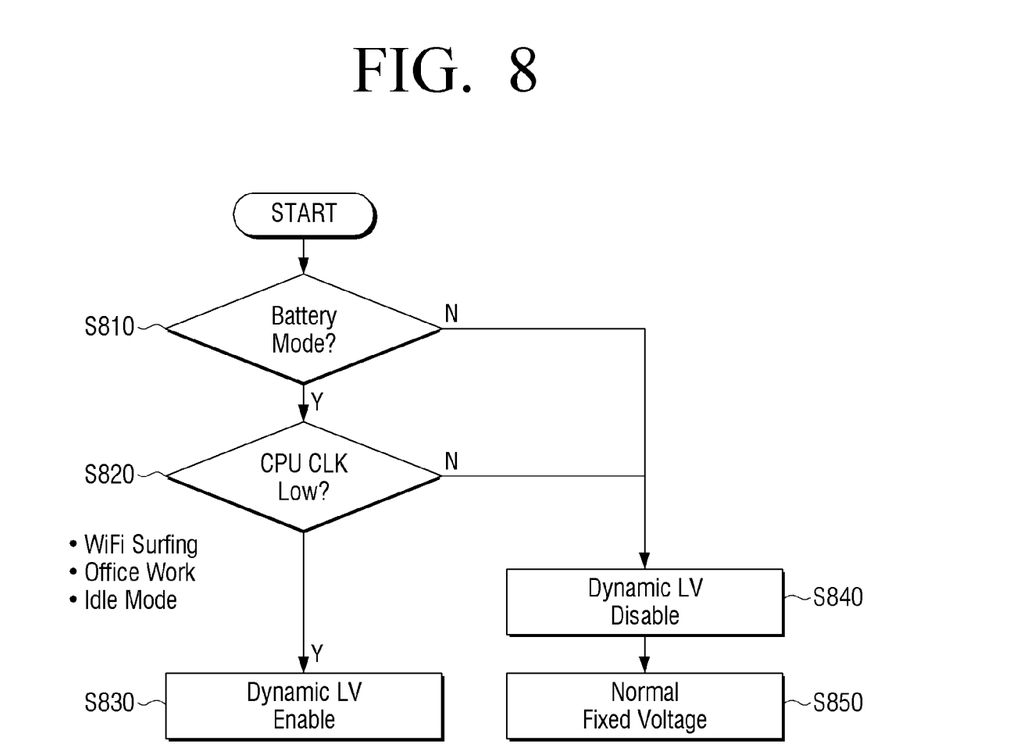
FIG. 8 is a flowchart illustrating a start condition of FIG. 7 according to an exemplary embodiment of the present general inventive concept.

FIG. 8 is a flowchart explaining a start condition of FIG. 7.

Referring to FIG. 8, it is determined whether a power supply using a battery is required (operation S810). Specifically, it may be determined whether the adapter is connected.

In the case where the power supply using a battery is required, it is determined whether the CPU operates at low clock (operation S820). Specifically, it may be determined whether the electronic device 100 is required to be driven in a power saving state.

If it is required to drive the electronic device in the power saving state using the battery (operation S820-Y), a power control operation as illustrated in FIG. 7 is performed (operation S830).

In contrast, if the power is supplied from the adapter (operation S810-N) or the electronic device operates in a normal state (operation S820-N), the respective converters may be made to output a preset reference voltage without performing the power control operation illustrated in FIG. 7.

While the general inventive concept has been shown and described with reference to certain embodiments thereof, it will be understood by those skilled in the art that various changes in form and detail may be made therein without departing from the spirit and principles of the present general inventive concept, the scope of which is defined by the appended claims and their equivalents.

What is claimed is:

1. An electronic device comprising:
    a first processor configured to perform an operation according to an input user command and to control a display to display a screen according to the result of the operation; and
    a power supply configured to supply a power to the display and the first processor,
    wherein the power supply including:
        a plurality of DC-DC converters configured to supply the power to respective loads of the electronic device, and to output voltage values that correspond to levels of the respective loads connected thereto,
        a port configured to receive an input of a DC voltage,
        at least one of the plurality of DC-DC converters configured to vary the input DC voltage to a preset first voltage to output the preset first voltage to a first connected load, and
        a second processor configured to sense the levels of the respective loads of the electronic device and to control the at least one of the plurality of DC-DC converters to output a voltage value that corresponds to a sensed level of the first connected load,
        wherein the at least one of the plurality of DC-DC converters and the second processor transmit or receive the sensed load level and control information through a serial communication that is a daisy chain.

2. The electronic device as claimed in claim 1, wherein when the sensed level of the first connected load is lower than a preset first load level, the second processor controls the at least one of the plurality of DC-DC converters to output a second voltage that is lower than the preset first voltage.

3. The electronic device as claimed in claim 2, wherein when the sensed level of the first connected load is higher than a second load level in a state where the second voltage is output, the second processor controls the at least one of the plurality of DC-DC converters to output the preset first voltage.

4. The electronic device as claimed in claim 3, wherein the second load level is smaller than the preset first load level.

5. The electronic device as claimed in claim 2, wherein the preset first load level is a nominal voltage of the first connected load.

6. The electronic device as claimed in claim 1, wherein the plurality of DC-DC converters have different reference output voltages.

7. The electronic device as claimed in claim 1, wherein the respective loads include at least one of a main board load of the electronic device, a memory, an input/output (I/O) configuration, and a graphic configuration.

8. The electronic device as claimed in claim 1, wherein the plurality of DC-DC converters of the power supply output voltage values that correspond to the levels of the respective loads connected thereto when the electronic device is driven through a battery power in a power saving state.

9. A power supply of an electronic device comprising:
    a port configured to receive an input of a DC voltage;
    a plurality of DC-DC converters configured to supply power to respective loads, and to output voltage values that correspond to levels of the respective loads connected thereto, and at least one of the plurality of DC-DC converters configured to vary the input DC voltage to a preset first voltage and to output the preset first voltage to loads connected to the electronic device; and
    a processor configured to sense levels of the respective loads and to control the at least one of the plurality of DC-DC converters to output voltage values that correspond to the sensed levels of the loads
    wherein the at least one of the plurality of DC-DC converters and the processor transmit or receive the sensed load level and control information through a serial communication that is a daisy chain.

10. The power supply as claimed in claim 9, wherein when a sensed level of a first load is lower than a preset first load level, the processor controls the at least one of the plurality of DC-DC converters to output a second voltage that is lower than the preset first voltage.

11. The power supply as claimed in claim 10, wherein when the sensed level of the first load is higher than a second load level in a state where the second voltage is output, the processor controls the at least one of the plurality of DC-DC converters to output the preset first voltage.

12. The power supply as claimed in claim 11, wherein the second load level is smaller than the preset first load level.

13. The power supply as claimed in claim 10, wherein the preset first load level is a nominal voltage of the first load.

14. The power supply as claimed in claim 9,
    wherein the plurality of DC-DC converters have different reference output voltages.

* * * * *